United States Patent
Kiefer et al.

[11] 3,867,428
[45] Feb. 18, 1975

[54] SUBSTITUTED CARBAMATES

[75] Inventors: Hans Kiefer, Wachenheim; Albrecht Mueller; Karl-Heinz Koenig, both of Frankenthal; Wolfgang Rohr, Mannheim; Heinrich Adolphi, Limburgerhof, all of Germany

[73] Assignee: Badische Anilin-& Soda-Fabrik Aktiengesellschaft, Ludwigshafen/Rhine, Germany

[22] Filed: Dec. 29, 1971

[21] Appl. No.: 213,746

[30] Foreign Application Priority Data
Jan. 8, 1971 Germany.......................... 2100684

[52] U.S. Cl...... 260/479 C, 260/327 M, 260/330.5, 260/340.9, 260/346.2 R, 424/275, 424/277, 424/278, 424/285, 424/300
[51] Int. Cl............................................. C07c 125/06
[58] Field of Search................................ 260/479 C

[56] References Cited
UNITED STATES PATENTS
2,592,254 4/1952 Dickey................................ 260/479

FOREIGN PATENTS OR APPLICATIONS
1,911,800 10/1969 Germany

Primary Examiner—James A. Patten
Attorney, Agent, or Firm—Johnston, Keil, Thompson & Shurtleff

[57] ABSTRACT
Substituted N-vinylcarbamates of the formula

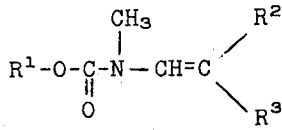

wherein $R^1$ is unsubstituted phenyl or a phenyl of limited substitution. These compounds are useful as pesticides.

3 Claims, No Drawings

SUBSTITUTED CARBAMATES

The present invention relates to new and valuable substituted N-vinylcarbamates; pesticides containing these compounds as active ingredients; and the use of the new compounds for controlling pests.

It is known to use substituted carbamates, for example N-methyl-1-naphthylcarbamate, for controlling pests. However, their action is not satisfactory.

We have now found that substituted carbamates of the formula I

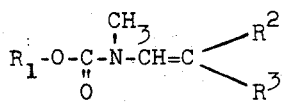

where $R^1$ denotes phenyl, naphthyl, dihydrobenzofuranyl or benzothiophenyl which may be substituted by lower alkyl (methyl, ethyl, propyl, butyl, pentyl), lower alkenyl, lower alkoxy, cycloalkyl, lower alkenoxy (propenoxy), lower alkynoxy (propynoxy, butynoxy), halogen (chlorine, bromine, iodine, fluorine), alkylamino, methylthio, acetal, thioacetal, dimethylaminomethylenimino or acylamino and $R^2$ and $R^3$ each denote hydrogen or methyl, have a strong insecticidal action. What is particularly surprising is the good synergistic effect of these compounds on phosphates. The active ingredients are applied by spraying or dusting them, together with carriers, onto the plants to be protected.

$R^1$ may for instance denote the following radicals:

| | |
|---|---|
| phenyl and diphenyl | |
| alkylated phenyl: | tolyl, n-propylphenyl, isopropylphenyl, n-butylphenyl, sec-butylphenyl, isobutylphenyl, tert-butylphenyl, ethylphenyl, butylphenyl, pentylphenyl; |
| alkenylphenyl: | propenylphenyl, butenylphenyl; |
| cycloalkylphenyl: | cyclopropylphenyl, cyclobutylphenyl, cyclopentylphenyl; |
| alkoxyphenyl: | methoxyphenyl, ethoxyphenyl, n-propoxyphenyl, isopropoxyphenyl, n-butoxyphenyl, sec-butoxyphenyl, isobutoxyphenyl, tert-butoxyphenyl; |
| alkenoxyphenyl: | allyloxyphenyl, propenoxyphenyl; |
| alkynoxyphenyl: | propynoxyphenyl, butynoxyphenyl, propynoxymethoxyphenyl; |
| alkylthiophenyl: | methylthiophenyl; |
| alkylaminophenyl: | dimethylaminophenyl, N-methyl-N-propynylaminophenyl, N-methyl-N-butynylaminophenyl; |
| acylaminophenyl: | acetylaminophenyl; |
| halophenyl: | chlorophenyl, bromophenyl, iodophenyl, fluorophenyl; | dimethylaminomethyleniminophenyl and salts of these compounds

| | |
|---|---|
| acetalphenyl: | 1,3-dioxolonephenyl, 1,3-dioxanephenyl, 1,3-dioxepanephenyl, 1,3-oxathiolanephenyl, 1,3-dithiolanephenyl, 1,3-dithianephenyl; |
| naphthyl: | α-naphthyl, β-naphthyl and naphthyl radicals containing the substituents under phenyl above; |
| benzofuranyl: | dihydrobenzofuranyl, dihydro-2-methylbenzofuranyl, dihydro-2,2-dimethylbenzofuranyl; |
| benzothiophenyl. | |

The phenyl, naphthyl and heterocyclic radicals may contain one or more of the above substituents; should the radical contain two or more substituents, they may be identical or different.

The compounds may for instance be prepared by the following processes:

a. Reaction of a compound of formula II

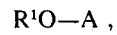

where $R^1$ has the meanings given above and A denotes a hydrogen atom or a metal atom, preferably an alkali metal atom, with a carbamyl chloride of formula III (German Laid-open Specification DOS 1,901,542)

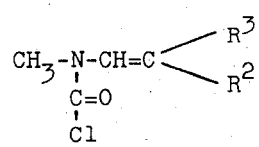

where $R^2$ and $R^3$ each denote methyl or hydrogen, in the presence or absence of a solvent. To accelerate the reaction it is advantageous to add organic or inorganic bases in stoichiometric amounts or in an excess. Examples of suitable bases are trimethylamine, triethylamine, pyridine, quinoline, dialkylcyclohexylamines and other tertiary amines or inorganic bases such as alkali metal hydroxides and alkali metal carbonates. The reaction may be carried out at atmospheric or superatmospheric pressure and within a temperature range of −20° to +200°C, preferably from 0° to 100°C. Suitable solvents are inert organic solvents such as aromatic hydrocarbons (benzene, toluene), chlorinated hydrocarbons (chloroform, carbon tetrachloride, dichloroethane) and ethers (diethylether, dioxane, tetrahydrofuran). It is extremely advantageous to use a large excess of a tertiary amine as solvent.

b. Reaction of chloroformates of formula IV

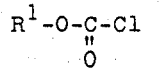

where $R^1$ has the meanings given above, with the appropriate amines. The starting materials $R^1OA$ may be obtained by conventional methods.

The agents according to the invention may be used as solutions, emulsions, suspensions or dusts. The form of application depends entirely on the purpose for which the agents are being used; in any case it should ensure a fine distribution of the active ingredient.

For the preparation of solutions to be sprayed direct, hydrocarbons having boiling points higher than 150°C, e.g. tetrahydronaphthalene or alkylated naphthalenes, or organic liquids having boiling points higher than 150°C and having one or more than one functional group, e.g. the keto group, the ether group, the ester group or the amide group, this group or these groups being attached as substituent(s) to a hydrocarbon chain or being a component of a heterocyclic ring, may be used as spray liquids.

Aqueous formulations may be prepared from emulsion concentrates, pastes or wettable powders by adding water. To prepare emulsions the ingredients as such or dissolved in a solvent may be homogenized in water or organic solvents by means of wetting or dispersing agents, e. g. polyethylene oxide adducts. Concentrates which are suitable for dilution with water may be prepared from active ingredient, emulsifying or dispersing agent and possibly solvent.

Dusts may be prepared by mixing or grinding the active ingredients with a solid carrier, e. g. kieselguhr, talc, clay or fertilizers.

The parts in the following examples are by weight.

EXAMPLE 1 o-chlorophenyl-N-methyl-N-vinylcarbamate 1,000 parts of triethylamine and 129 parts of o-chlorophenol are placed in a round flask equipped with a stirrer, reflux condenser and dropping funnel. At room temperature, 120 parts of N-methyl-N-vinylcarbamyl chloride is dripped in and the whole subsequently stirred for 3 hours at 80°C. During the reaction crystalline triethylamine hydrochloride is precipitated out.

After cooling, 200 parts of water is added and the salt is brought into solution. The organic reaction phase is separated from the aqueous layer and extracted three times with a 10 percent caustic solution and once with water. The aqueous phase is extracted with benzene. The combined organic layers are dried over sodium carbonate and subsequently fractionated by vacuum distillation.

Boiling point (0.5 mm Hg): 109°C; yield: 85.6%.
Analysis: calculated for $C_{10}H_{10}ClNO_2$ (211.5):
calc.: C 56.7; H 4.7; N 6.6; Cl 16.8;
found: C 56.2; H 5.0; N 6.9; Cl 15.8.
NMR and infrared spectroscopy confirm the structure of the compound:

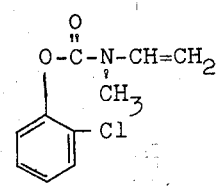

EXAMPLE 2 m-tert-butylphenyl-N-methyl-N-vinylcarbamate

A solution of 150 parts of m-tert-butylphenol in 1,000 parts of triethylamine is filled into a round flash equipped with a stirrer, reflux condenser and dropping funnel. At room temperature, 120 parts of N-methyl-N-vinylcarbamyl chloride is added and the whole stirred for 4 hours at 80°C.

After cooling, 200 parts of water is added and the precipitated triethylamine hydrochloride goes into solution. The aqueous phase is separated and the organic phase is extracted three times with a dilute caustic solution and once with water. After drying over sodium carbonate, fractional distillation is carried out.

Boiling point (0.3 mm Hg): 107° to 109°C; yield: 89.3%.
Analysis: calculated for $C_{14}H_{19}NO_2$ (233):
calc.: C 72.1; H 8.1; N 6.0;
found: C 72.7; H 8.4; N 6.1.
NMR and infrared spectroscopy confirm the following structure:

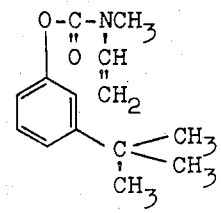

The following compounds were prepared in the same manner:

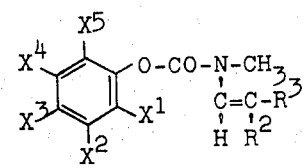

O.Z. 27,271

| $X^1$ | $X^2$ | $X^3$ | $X^4$ | $X^5$ | $R^3$ | $R^2$ | b.p./m.p.(°C) |
|---|---|---|---|---|---|---|---|
| Cl | | H | H | H | H | H | |
| H | $CH_3$ | H | $-CH(CH_3)_2$ (isopropyl — see image) | H | H | H | |

-Continued

O.Z. 27,271

| $X^1$ | $X^2$ | $X^3$ | $X^4$ | $X^5$ | $R^3$ | $R^2$ | b.p./m.p. (°C) |
|---|---|---|---|---|---|---|---|
| -O-CH(CH$_3$)$_2$ | H | H | H | H | H | H | 124°/0.2 mm Hg |
| -O-CH(CH$_3$)$_2$ | H | H | H | H | H | CH$_3$ | 123°/0.1 mm Hg |
| H | -C(CH$_3$)$_3$ | H | H | H | H | CH$_3$ | 143°/0.2 mm Hg |
| -CH(CH$_3$)$_2$ | H | H | H | H | H | H | 111°/0.1 mm Hg |
| -C-H(CH$_3$)$_2$ | H | H | H | H | H | CH$_3$ | 118°/0.2 mm Hg |
| H | CH$_3$ | CH$_3$ | H | H | CH$_3$ | CH$_3$ | 132°/0.2 mm Hg |
| H | -C-H(CH$_3$)$_2$ | H | CH$_3$ | H | H | CH$_3$ | 133°/0.2 mm Hg |
| H | -C(CH$_3$)$_3$ | H | -C(CH$_3$)$_3$ | H | H | CH$_3$ | 127°/0.3 mm Hg |
| H | CH$_3$ | N(CH$_3$)$_2$ | CH$_3$ | H | H | H | |
| -O-CH$_2$-CH=CH$_2$ | H | H | H | H | H | H | |
| H | CH$_3$ | -S-CH$_3$ | H | H | H | H | $n_D^{20}$ 1.5631 |
| -CH(O-CH-CH$_3$)(O-CH-CH$_3$) | H | H | H | H | H | H | 139°/0.01 mm Hg |
| H | C$_2$H$_5$ | H | C$_2$H$_5$ | H | H | H | 124°/0.5 mm Hg |
| -CH(O-CH$_2$)(O-CH$_2$) | H | H | H | H | H | H | 146°/0.01 mm Hg |
| -CH(S-CH$_2$)(S-CH$_2$) | H | H | H | H | H | H | 182°/0.01 mm Hg |
| CH$_3$ | H | CH$_3$ | H | CH$_3$ | H | H | 100°/0.3 mm Hg |
| -O-C-H(CH$_3$)(C≡CH) | H | H | H | H | H | H | 114°/0.2 mm Hg |
| (O-cyclic) | | H | H | H | H | H | 120 to 123°/ 0.1 mm Hg |
| CH$_3$ | H | CH(CH$_3$)$_2$ | H | H | H | H | 113 to 116°/ 0.01 mm Hg |
| -C(CH$_3$)$_3$ | H | CH$_3$ | H | C(CH$_3$)$_3$ | H | H | |
| -C(CH$_3$)$_3$ | H | H | H | H | H | H | 101 to 103°/ 0.3 mm Hg |
| -N=CH-N(CH$_3$)$_2$ | H | H | H | H | H | H | |
| Br | H | H | H | H | H | H | $n_D^{20}$ 1.5564 |
| H | CH$_3$ | CH$_3$ | CH$_3$ | H | H | H | |

—Continued

| $X^1$ | $X^2$ | $X^3$ | $X^4$ | $X^5$ | $R^3$ | $R^2$ | b.p./m.p.(°C) |
|---|---|---|---|---|---|---|---|
| -C(CH₃)₂-CH₂-CH₃ | H | H | H | H | H | H | |
| H | -NH-C(=O)-CH₃ | H | H | H | H | H | |
| cyclopentyl | H | H | H | H | H | H | |
| H | -CH(CH₃)₂ | H | H | H | H | CH₃ | 133°/0.3 mm Hg |
| H | cyclopentadienyl | H | H | H | H | CH₃ | 163°/0.3 mm Hg |
| H | CH₃ | CH₃ | H | H | H | H | 103°/0.2 mm Hg |
| H | -C(CH₃)₃ | H | -C(CH₃)₃ | H | H | H | 93° |
| cyclopentadienyl | H | H | H | H | H | H | 150°/0.3 mm Hg |
| H | H | CH₃-S | H | H | H | H | 160°/0.5 mm Hg |
| -CH(O-CH₂/O-CH₂) | H | H | H | H | H | CH₃ | 157°/0.3 mm Hg |
| -CH(O-CH-CH₃/O-CH-CH₃) | H | H | H | H | H | CH₃ | 150°/0.1 mm Hg |
| | -O-C(CH₃)₂-CH₂- | H | H | H | H | H | m.p. 60 to 61° |
| -CH(CH₃)-CH=CH₂ | H | H | H | H | H | H | |

The biological action of the new compounds is illustrated below:

I 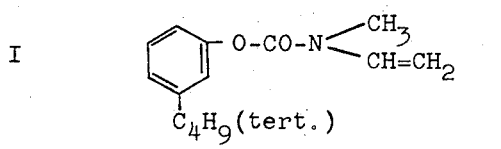

II 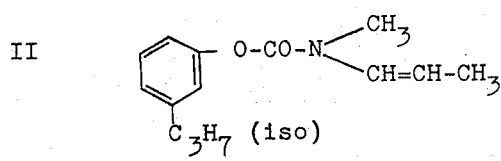

III 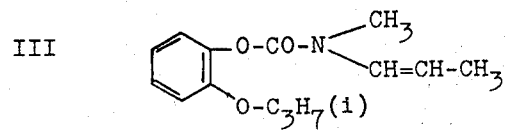

IV 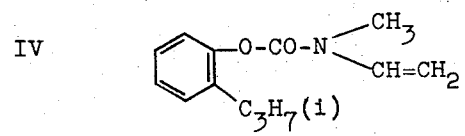

—Continued

| $X^1$ | $X^2$ | $X^3$ | $X^4$ | $X^5$ | $R^3$ | $R^2$ | b.p./m.p.(°C) |
|---|---|---|---|---|---|---|---|
| V | 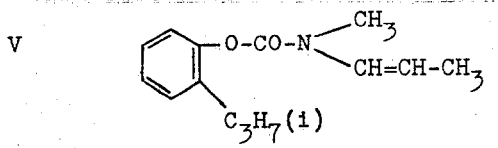 | | | | | | |
| VI | 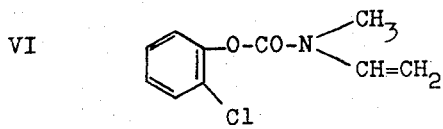 | | | | | | |
| VII | 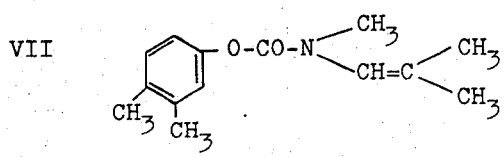 | | | | | | |
| VIII | 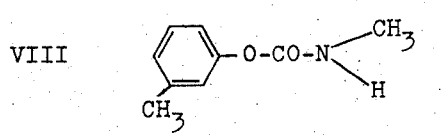 | | | | | | prior art active ingredient used for comparison purposes |

EXAMPLE 3

Continuous contact experiment with cockroaches (*Blatta orientalis*); action (mortality) after 48 hours; experiment is carried out in 1 liter glass vessels.

| Active ingredient | | |
|---|---|---|
| II | 0.25 mg/beaker | —mortality of more than 80% |
| VIII (comparative agent) | 0.5 mg/beaker | —mortality of more than 80% |

EXAMPLE 4

Synergistic action on red flour beetle (*Tribolium castaneum*) - resistant to malathion; experiment is carried out in Petri dishes; action is determined after 24 hours.

| malathion | $LD_{50}$ | 1.1 mg/dish |
|---|---|---|
| VII + malathion | $LD_{50}$ | 0.2 mg + 0.2 mg/dish |
| VII | | 0.5 mg/dish: 10% mortality |
| VI + malathion | $LD_{50}$ | 0.5 + 0.5 mg/dish |
| VI | | 0.5 mg/dish: 10% mortality |

EXAMPLE 5

Propagation test on cotton stainer (*Dysdercus intermedius*); food is treated once with an aqueous emulsion.

| I | 0.025% | complete growth inhibition |
|---|---|---|
| II | 0.025% | complete growth inhibition |
| III | 0.025% | complete growth inhibition |
| IV | 0.025% | complete growth inhibition |
| V | 0.025% | complete growth inhibition |

EXAMPLE 6

80 parts by weight of compound I is mixed with 20 parts by weight of N-methyl-α-pyrrolidone. A mixture is obtained which is suitable for application in the form of very fine drops.

EXAMPLE 7

20 parts by weight of compound II is dissolved in a mixture consisting of 80 parts by weight of xylene, 10 parts by weight of the adduct of 8 to 10 moles of ethylene oxide to 1 mole of oleic acid-N-monoethanolamide, 5 parts by weight of the calcium salt of dodecylbenzenesulfonic acid, and 5 parts by weight of the adduct of 40 moles of ethylene oxide to 1 mole of castor oil. By pouring the solution into 100,000 parts by weight of water and uniformly distributing it therein, an aqueous dispersion is obtained containing 0.02 percent by weight of the active ingredient.

EXAMPLE 8

20 parts by weight of compound III is dissolved in a mixture consisting of 40 parts by weight of cyclohexanone, 30 parts by weight of isobutanol, 20 parts by weight of the adduct of 7 moles of ethylene oxide to 1 mole of isooctylphenol, and 10 parts by weight of the adduct of 40 moles of ethylene oxide to 1 mole of castor oil. By pouring the solution into 100,000 parts by weight of water and uniformly distributing it therein, an aqueous dispersion is obtained containing 0.2 percent by weight of the active ingredient.

EXAMPLE 9

20 parts by weight of compound IV is dissolved in a mixture consisting of 25 parts by weight of cyclohexanol, 65 parts by weight of a mineral oil fraction having a boiling point between 210° and 280°C, and 10 parts by weight of the adduct of 40 moles of ethylene oxide to 1 mole of castor oil. By pouring the solution into 100,000 parts by weight of water and uniformly distributing it therein, an aqueous dispersion is obtained containing 0.02 percent by weight of the active ingredient.

EXAMPLE 10

20 parts by weight of compound V is well mixed with 3 parts by weight of the sodium salt of diisobutylnaphthalene-α-sulfonic acid, 17 parts by weight of the sodium salt of a ligninsulfonic acid obtained from a sulfite waste liquor, and 60 parts by weight of powdered silica gel, and triturated in a hammer mill. By uniformly distributing the mixture in 20,000 parts by weight of water, a spray liquid is obtained containing 0.1 percent by weight of the active ingredient.

EXAMPLE 11

3 parts by weight of compound VI is intimately mixed with 97 parts by weight of particulate kaolin. A dust is obtained containing 3 percent by weight of the active ingredient.

EXAMPLE 12

30 parts by weight of compound VII is intimately mixed with a mixture consisting of 92 parts by weight of powdered silica gel and 8 parts by weight of paraffin oil which has been sprayed onto the surface of this silica gel. A formulation of the active ingredient is obtained having good adherence.

We claim:
1. A compound of the formula

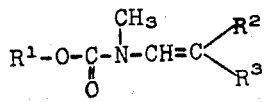

wherein:
R$^1$ is phenyl substituted once by lower alkoxy, lower alkenoxy, or lower alkynoxy;
R$^2$ is methyl or hydrogen;
R$^3$ is methyl or hydrogen.

2. A compound as claimed in claim 1 wherein R$^1$ is phenyl substituted once by lower alkoxy and R$^2$ and R$^3$ each denote methyl or hydrogen.

3. The compound of the formula

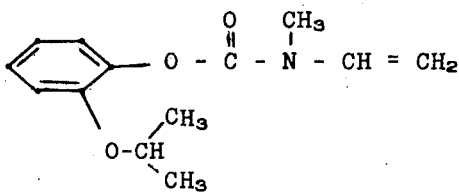

* * * * *